United States Patent
Rohde (10) Patent No.: US 10,103,816 B2
(45) Date of Patent: Oct. 16, 2018

(54) METHOD AND SYSTEM FOR DECODING A MODULATED SIGNAL

(71) Applicant: Xieon Networks S.à.r.l., Senningerberg (LU)

(72) Inventor: Harald Rohde, Munich (DE)

(73) Assignee: Xieon Networks S.a.r.l., Senningerberg (LU)

(*) Notice: Subject to any disclaimer, the term of this patent is extended or adjusted under 35 U.S.C. 154(b) by 10 days.

(21) Appl. No.: 15/507,928

(22) PCT Filed: Aug. 12, 2015

(86) PCT No.: PCT/EP2015/068581
§ 371 (c)(1),
(2) Date: Mar. 1, 2017

(87) PCT Pub. No.: WO2016/034382
PCT Pub. Date: Mar. 10, 2016

(65) Prior Publication Data
US 2017/0294972 A1    Oct. 12, 2017

(30) Foreign Application Priority Data
Sep. 4, 2014 (EP) .................................. 14183545

(51) Int. Cl.
*H04B 10/06* (2006.01)
*H04B 10/63* (2013.01)
(Continued)

(52) U.S. Cl.
CPC .......... *H04B 10/63* (2013.01); *H04B 10/611* (2013.01); *H04B 10/612* (2013.01); *H04L 27/2647* (2013.01)

(58) Field of Classification Search
CPC .. H04B 10/611; H04B 10/612; H04B 10/613; H04B 10/614; H04B 10/6161;
(Continued)

(56) References Cited

U.S. PATENT DOCUMENTS 6,188,335 B1    2/2001 Roth et al.
2008/0205905 A1*    8/2008 Tao .................... H04B 10/61
                                                                398/204
(Continued)

FOREIGN PATENT DOCUMENTS

EP    2224658 A1    9/2010

OTHER PUBLICATIONS

International Search Report and Written Opinion, PCT/EP2015/068581, dated Oct. 30, 2015, 9 pages.

*Primary Examiner* — Hanh Phan
(74) *Attorney, Agent, or Firm* — Nelson Mullins Riley & Scarborough LLP (57) ABSTRACT

In a method and system for decoding a differential M-ary phase or quadrature amplitude modulated signal, the incoming signal is decoded according to a plurality of different decoding rules, wherein said plurality of decoding rules correspond to different values of a resulting frequency difference or mismatch between a signal frequency and a local oscillator reference frequency. The invention allows to increase a tolerance window for the maximal allowable frequency offset, and thus helps to speed up an initial locking process or to allow for equipment which has a lower tuning granularity.

14 Claims, 3 Drawing Sheets

(51) Int. Cl.
*H04L 27/26* (2006.01)
*H04B 10/61* (2013.01)

(58) Field of Classification Search
CPC ............ H04B 10/6165; H04B 10/6164; H04B 10/615; H04B 10/6163
USPC ....... 398/202, 203, 204, 205, 206, 207, 208, 398/209, 210, 183, 184, 188, 135, 136, 398/33, 38, 25, 26, 27, 158, 159
See application file for complete search history.

(56) References Cited

U.S. PATENT DOCUMENTS

| | | |
|---|---|---|
| 2011/0085797 A1 | 4/2011 | Xu et al. |
| 2011/0135041 A1 | 6/2011 | Ezaki et al. |
| 2013/0209089 A1* | 8/2013 | Harley ............... H04B 10/5561 398/25 |
| 2014/0086594 A1* | 3/2014 | Xie .................... H04B 10/6161 398/208 |
| 2014/0356003 A1* | 12/2014 | Randel ................ H04B 10/616 398/210 |

* cited by examiner

METHOD AND SYSTEM FOR DECODING A MODULATED SIGNAL

CROSS REFERENCE TO RELATED APPLICATIONS

This application is a 35 U.S.C. 371 national stage filing of International Application No. PCT/EP2015/068581, filed on Aug. 12, 2015, which claims priority to European Patent Application No. 14183545.4 filed on Sep. 4, 2014. The contents of the aforementioned applications are hereby incorporated by reference in their entireties.

FIELD OF THE INVENTION

The invention relates to an improved method and system for decoding a modulated signal, in particular a coherently received and decoded differential M-ary phase or quadrature amplitude-modulated optical signal.

BACKGROUND OF THE INVENTION

In a coherent optical reception of differential M-ary phase-modulated signals, the incoming optical signal at some given frequency is non-linearly mixed (or superimposed) with a reference local oscillator that is set at a close-by frequency. The desired outcome is a mixing signal at the difference frequency, which carries the information (such as amplitude, phase, and frequency modulation) of the original higher frequency signal in the phase angle, but is oscillating at a lower, and hence more easily processed frequency.

The detected phase angle depends on two factors: the transmitted (sent) symbol and the frequency offset between the local oscillator laser and the center frequency of the incoming optical signal. In a homodyne coherent detection scheme, one strives to set the frequency of the local oscillator exactly at the center wavelength of the optical signal, and hence the frequency offset is zero. In practice, a perfect matching of the frequencies can hardly be achieved, and hence homodyne detection schemes are usually "intradyne" in practice, i.e., the wavelength of the local oscillator does not equal the center wavelength of the incoming signal, but lies very close to it and within the spectrum of the incoming signal. However, in many practical applications, heterodyne detection schemes, in which the wavelength of the local oscillator lies outside of the spectrum of the incoming signal are becoming increasingly popular, mostly because they can be implemented with a smaller number of optical components. In a heterodyne detection scheme, the frequency offset between the local oscillator laser and the center frequency of the incoming optical signal is electronically compensated by multiplying ("down-converting") the received signal with a sine or cosine function with the difference frequency.

In both homodyne/intradyne and heterodyne detection, the outcome of the mixing are two baseband signals which contain an in-phase (I) component and a quadrature (Q) component of the signal. The in-phase component and the quadrature component can be represented grapically in a constellation diagram, and different range values (or bins) of the components can be associated with different signal bits. The assignment of quadrature components to the signal bits constitutes a decoding scheme that allows to extract the encoded signal from the in-phase component and quadrature component.

Due to imperfections in the electronic equipment and the limited frequency stability of the local oscillator laser, a perfect frequency offset can hardly be achieved in practice, neither in intradyne detection nor in heterodyne detection. As a result of an imperfect offset, the detected differential phase angles are rotated in the constellations. If the frequency offset is too large, the differential phase angles cannot be detected correctly any longer. For practical purposes, either the local oscillator frequency deviations or the down-conversion frequencies have to be kept below a threshold of about ±50 MHz to allow for reliable detection for the case of a 622 Mbaud (D) QPSK modulated signal. This is not too big a technical challenge, and has been shown to work fine and stable.

However, the above condition means that initially, when the system is started up and the local oscillator laser scans the available band for a signal, the scanning process needs to be conducted very slowly in order to get close enough to hit the right frequency window. A typical tunable laser covers an optical frequency band of about 4 Terahertz or more. Scanning that band with the resolution of 100 MHz requires 40,000 steps or more. After each laser frequency step, the digital signal processing decodes the received bits and tries to recognize the pre-determined frame delimiting bit pattern in the received data stream. For M=4, the bit stream consists of two bit pairs. However, it is generally unknown where the bytes themselves start within this bit stream. Typically, parallel frame hunter units are employed to scan the bit stream for the frame delimiting pattern, with each frame hunter employing a different offset within the bit stream. For M=4, four parallel frame hunter units are conventionally used. Assuming that a laser scans 100 steps per second, a full local oscillator laser scan can take up to 400 seconds, which is an unacceptably long time interval for many practical applications.

In the prior art, amplitude detection has been employed to increase the scanning speed. In these schemes, a coarse scan is conducted until a signal amplitude increase is detected, and only then the fine tuning of the laser is performed as described above. However, these schemes introduce additional complexities.

What is needed is an improved decoding method that allows to speed up the scanning process when the system is started.

OVERVIEW OF THE INVENTION

This objective is achieved with a method and a system for decoding a modulated signal in accordance with independent claims 1 and 11, respectively. The dependent claims refer to preferred embodiments.

A method for decoding a modulated signal according to the present invention comprises a step of receiving an encoded signal, said encoded signal comprising a pair of an in-phase component and a quadrature component being extracted from a mixing signal, said mixing signal being obtained from mixing a received modulated signal at a first frequency with a local oscillator signal at a second frequency. The method further comprises a step of decoding said encoded signal according to a plurality of different decoding rules, said plurality of decoding rules corresponding to different values of a resulting frequency difference or mismatch between said first frequency and said second frequency.

The present invention is based on the realization that by providing several different decoding rules (rather than a single decoding rule, as in the state of the art), the decoding method can accommodate larger frequency offsets between the local oscillator laser and the center frequency of the incoming optical signal. Different decoding rules may be chosen corresponding to different values or ranges of a resulting frequency difference or mismatch between said first frequency of the received modulated signal and said second frequency of the local oscillator signal. The different decoding rules can be tentatively tested in parallel, allowing a more reliable and faster decoding of the encoded signal even in the presence of substantial frequency offsets between the local oscillator laser and the center frequency of the incoming optical signal. The inventors found that by choosing a sufficiently large number of decoding rules, arbitrary differences or mismatches between the first frequency and the second frequency can be accommodated, unless the receiver bandwidth becomes the limiting factor The method according to the present invention may sometimes enhance the requirements for the data processing, since several different decoding rules rather than a single decoding rule need to be employed and tested in the decoding step. However, the inventors found that the enhanced scanning speed in the initial locking process more than compensates for the additional processing time or resources. At the same time, the invention allows to tolerate higher local oscillator offsets, and hence allows to employ less accurate and thereby cheaper laser equipment with lower tuning granularity.

Decoding said encoded signal according to a plurality of different decoding rules may preferably be done in parallel, to minimize the processing time. However, the present invention also achieves advantages over the prior art if some or all of the processing needs to be done sequentially.

Encoding, in the sense of the present invention, may be understood as a process in which a digital or analog signal is conveyed by means of a modulated physical carrier signal, either transmitting wirelessly or over a cable connection, and preferably an optical signal. Said encoded signal may represent a sequence of bits or bytes, as an example.

The decoding process, in the sense of the present invention, can be understood to denote the inverse process in which the encoded information or a modified version thereof, for example represented as the sequence of bits or bytes, is retrieved from the encoded signal. Retrieving the encoded information may not always be perfectly possible, and in many practical applications it will be sufficient if the encoded information can be retrieved approximately, or with sufficiently high accuracy.

In the context of the present invention, decoding said encoded signal according to said plurality of said different decoding rules may comprise a step of testing said different decoding rules and determining which of said different decoding rules provides accurate decoding results.

In a preferred embodiment, said decoding step comprises a step of identifying a pre-determined reference outcome in said decoded signal. Said pre-determined reference outcome may indicate which of the tested different decoding rules provides the best decoding results.

In particular, said encoded signal may comprise a pre-determined sequence of test symbols, such as a delimiter pattern. The reference outcome may correspond to the expected decoded result of the faithful transmission of the test sequence. Hence, by searching for the test sequence employing a plurality of different decoding rules, the one decoding rule that yields the expected reference outcome can be identified as the accurate or appropriate decoding rule corresponding to the resulting frequency difference or mismatch between said first frequency and said second frequency.

The invention may further comprise the step of determining said frequency difference or mismatch, or at least a range of said frequency difference or mismatch, based on said identified reference outcome.

In a preferred embodiment, the method further comprises a step of adjusting said frequency difference or mismatch in accordance with said identified reference outcome.

Adjusting said frequency difference or mismatch may in particular comprise a step of tuning a local oscillator, such as a local oscillator laser, that supplies said local oscillator signal.

By adjusting said frequency difference or mismatch, the effect of the frequency offset between the local oscillator laser and the center frequency of the incoming optical signal may be compensated. Adjusting said frequency may amount to returning to a standard frame of reference or decoding rule.

Alternatively, said decoding rule that has been determined to correspond to the actual frequency difference or mismatch, such as the decoding rule that reproduces the expected reference outcome, can be employed to decode subsequent signals, without a need to re-adjust the frequency difference or mismatch or to tune the local oscillator.

Hence, in a preferred embodiment, the method comprises a step of selecting a decoding rule among said plurality of different decoding rules, and employing said selected decoding rule to decode subsequent encoded signals.

In a preferred embodiment, said different decoding rules correspond to different assignment rules, and said decoding step comprises the step of assigning different information symbols to said encoded signal in accordance with said different assignment rules.

For instance, said decoding rules may comprise different decoding tables for different ranges of said frequency difference or frequency mismatch. Said encoded signals may then be tentatively decoded employing said plurality of different decoding tables, and the correct decoding table may be determined as the decoding table that reproduces the predetermined reference outcome.

Hence, in a preferred embodiment, the method comprises the further step of comparing a plurality of sequences of said information symbols to a predetermined reference outcome, said plurality of sequences corresponding to said different assignment rules.

Alternatively, said decoding step may comprise the step of assigning information symbols to said encoded signal in accordance with a given assignment rule, such as a given decoding table, and said decoding step may further comprise the step of comparing said information symbols against a plurality of reference outcomes.

In this alternative configuration, the different decoding rules (corresponding to different values or ranges of the frequency difference or mismatch) are incorporated in a corresponding plurality of reference outcomes. Identifying the matching reference outcome then allows to infer the value or range of the resulting frequency difference or mismatch.

In a preferred embodiment, said modulated signal is an optical signal, in particular an M-ary modulated signal, M being a positive integer.

Preferably said modulated signal is an optical M-ary phase modulated signal or an optical M-ary quadrature amplitude modulated signal.

The method according to the present invention may further comprise a step of receiving said modulated signal at said first frequency.

In a preferred embodiment, the method further comprises a step of providing said mixing signal by mixing said received modulated signal with a local oscillator signal, said local oscillator signal having said second frequency.

The method according to the present invention may also comprise the step of extracting said in-phase component and said quadrature component from said mixing signal.

In a preferred embodiment, said in-phase component and said quadrature component are extracted from said mixing signal by means of heterodyne detection, which may comprise down-conversion.

However, the method according to the present invention can also be employed in the context of homodyne detection or intradyne detection.

The invention also relates to a system for decoding a modulated signal, said system comprising a receiving unit adapted to receive an encoded signal, said encoded signal comprising a pair of an in-phase component and a quadrature component being extracted from a mixing signal, said mixing signal being obtained from mixing a received modulated signal at a first frequency with a local oscillator signal at a second frequency. The system further comprises a decoding unit adapted to decode said encoded signal according to a plurality of different decoding rules, said plurality of decoding rules corresponding to different values of a resulting frequency difference or mismatch between said first frequency and said second frequency.

In a preferred embodiment, said system comprises a local oscillator unit providing said local oscillator signal at said second frequency.

The system may further comprise a mixing unit adapted to receive said modulated signal at said first frequency, to mix said modulated signal with said local oscillator signal and to extract said pair of said in-phase component and said quadrature component from said mixing signal, when said mixing unit is further adapted to provide said extracted pair to said decoding unit.

In a preferred embodiment, said decoding unit comprises a frame hunter unit adapted to compare said decoded signal to a pre-determined reference outcome.

In general, said system may be adapted to implement a method with some or all of the features as described above.

The invention also relates to a computer program product 13 (FIG. 1) comprising computer-readable instructions 15 that cause a computer 11 coupled to a system with some or all of the features described above to implement on said system a method with some or all of the features described above.

DETAILED DESCRIPTION OF PREFERRED EMBODIMENTS

The features and numerous advantages of the method and system for decoding a modulated signal according to the present invention will be best apparent from a detailed description of preferred embodiments with reference to the accompanying drawings, in which.

Figure 1:
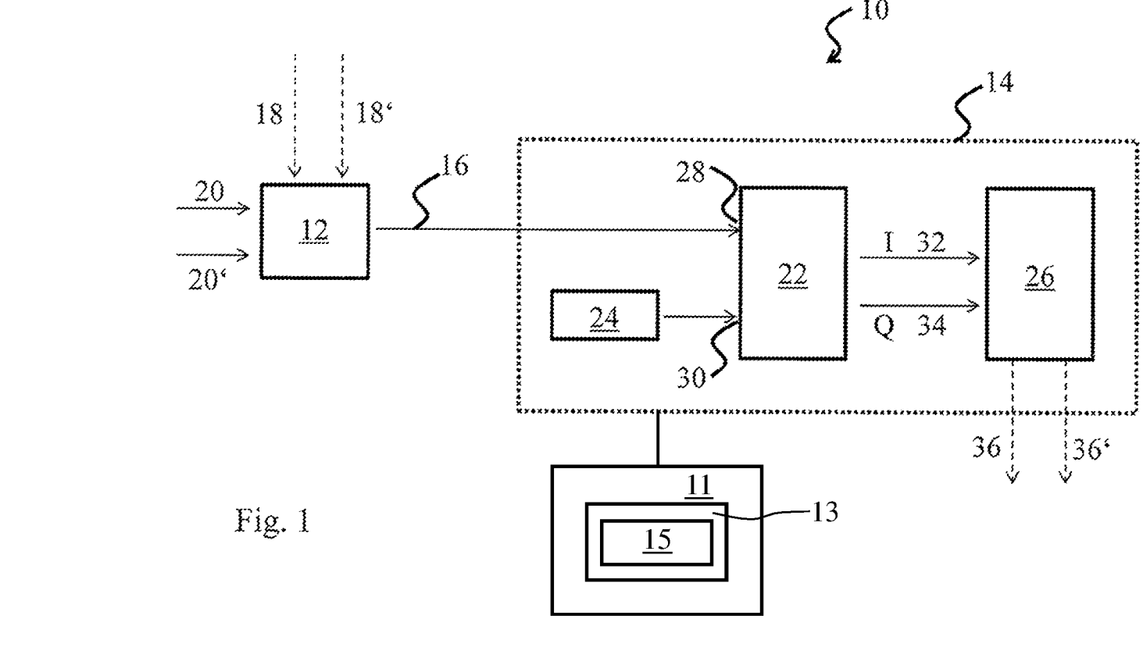
FIG. 1 is a schematic view of a system for transmitting a modulated signal which comprises a system for decoding the signal according to an embodiment of the present invention.

FIG. 1 is a schematic diagram of a system 10 for transmitting a quadrature amplitude modulated signal between a sender unit 12 and a receiver unit 14 over an optical channel 16, such as a fiber optical link. In the sender unit 12, two digital message bit streams 18, 18' are encoded by changing (modulating) the amplitudes of two carrier signals 20, 20'. The two carrier signals 20, 20', usually sinusoidal waves, are out of phase with each other by 90° and lead to quadrature amplitude modulation (QAM). In the sender unit 12, the modulated waves are summed up, and the resulting wave form is a combination of both phase-shift keying (PSK) and amplitude-shift keying (ASK), or phase modulation and amplitude modulation.

The resulting signal is sent via the optical channel 16 to the receiver unit 14. As illustrated in FIG. 1, the receiver unit comprises a mixing unit 22, a local oscillator unit 24 and a decoding unit 26. The mixing unit 22 receives the modulated optical signal at a first input 28, and has a second input 30 for a local oscillator signal supplied by the local oscillator unit 24. The local oscillator unit 24 may generate a local oscillator signal by means of a laser, and may provide the local oscillator signal to the second input 30, as is generally known in the art.

The mixing unit 22 serves as a coherent demodulator for demodulating the incoming optical signal. To this end, the incoming optical signal received at the first input 28 is superimposed with the local oscillator signal received at the second input 30. At the receiving photodiode, the superposition results in a current that is proportional to the product of the electrical field of the local oscillator laser and the electrical field of the incoming signal. In addition, the current oscillates with the difference of the angular frequency of the local oscillator signal and the incoming modulated signal, $$I_{PD} \sim 2 * E_{LO} * E_{signal} * \sin((\omega_{LO} - \omega_{signal}) * t + \varphi(t))$$

In this equation, $I_{ND}$ denotes the generated photocurrent, $E_{LO}$ the electric field of the local oscillator, $E_{signal}$ the electric field of the modulated incoming signal, $\omega_{LO}$ the angular frequency of the local oscillator signal, and $\omega_{signal}$ the angular frequency of the incoming modulated signal, t denotes the time and $\varphi(t)$ describes the time-dependent phase which contains the transmitted data information.

As can be seen from the equation, the photodiode current depends on the differential angular frequency of the two light sources, $\omega_{LO} - \omega_{signal}$. This oscillating term is either completely deleted by equalizing both laser frequencies (so-called "homodyne coherent detection"), or it is electronically compensated by multiplying ("down-converting") the received signal with a sine function and a cosine function with the difference frequency ("heterodyne detection"). In any case, the mixing unit 22 supplies a first signal 32 comprising the "in-phase" (I) component of the demodulated signal and a second signal 34 comprising the "quadrature" (Q) component of the demodulated signal. The in-phase component 32 and the quadrature component 34 are supplied to the decoding unit 26 for data recovery by means of digital signal processing (DSP).

In an M-ary differential modulation scheme, the transmitted information is encoded into the relative phase difference between two symbols, i.e., $\Delta\varphi = \varphi(t_2) - \varphi(t_1)$. Depending on the number M of possible differential phases, $\log_2(M)$ bits can be transmitted per symbol. As an example, for M=4

$\log_2(4)=2$ bits per symbol can be transmitted. In other words, for M=4, $\Delta\varphi$ can have four different values, assuming an ideal signal and an ideal receiver. The bit stream is then reconstructed by assigning those four differential phase angle pairs to two data bits. An example is shown in the following Table 1:

TABLE 1 assignment of the detected bits for different values of φ

| φ (degrees) | Bit "I" | Bit "Q" |
| --- | --- | --- |
| 0 | 0 | 0 |
| 90 | 0 | 1 |
| 180 | 1 | 0 |
| 270 | 1 | 1 |

Table 1 merely shows one possible assignment, as an example. As long as a one-to-one correspondence between bit pairs {I,Q} and ranges of the phase difference φ is established, the assignment is completely arbitrary and can be chosen differently from Table 1. For instance, in an alternative example a "Gray Code" may be employed to assign the values such that only one bit value differs from line to line in Table 1.

In order to retrieve the phase difference y from the incoming signal, the decoding unit 26 samples the baseband signals 32, 34 preferably in the middle of the time slot assigned to each symbol. The phase of the optical signal field at the time t can then be calculated as $\varphi_t$=arctan (I/Q). The phase difference can then be calculated as $\Delta\varphi=\varphi(t_2)-\varphi(t_1)$, where $\Delta t=t_2-t_1$ denotes the symbol duration.

Figure 2:
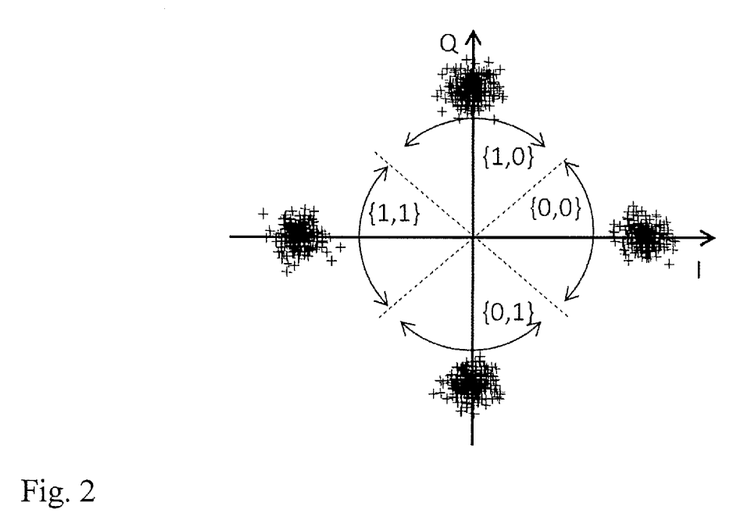
FIG. 2 is a schematic constellation diagram for an example in which two bits per symbol are transmitted, and with perfect frequency compensation.

FIG. 2. shows an exemplary constellation diagram in which the I component and the Q component are plotted for a plurality of received signals, and bins or quadrants (delimited by broken lines) are assigned to bit pairs according to Table 1. The distribution of the signals shown in FIG. 2 is due to noise in the signal and the receiving equipment, which cannot be totally avoided in practice. The decoding unit 26 reconstructs the bit sequence from the constellation components I and Q according to Table 1 and outputs a pair of decoded signal bit streams 36, 36' that reconstruct the message bit streams 18, 18'.

Figure 3:
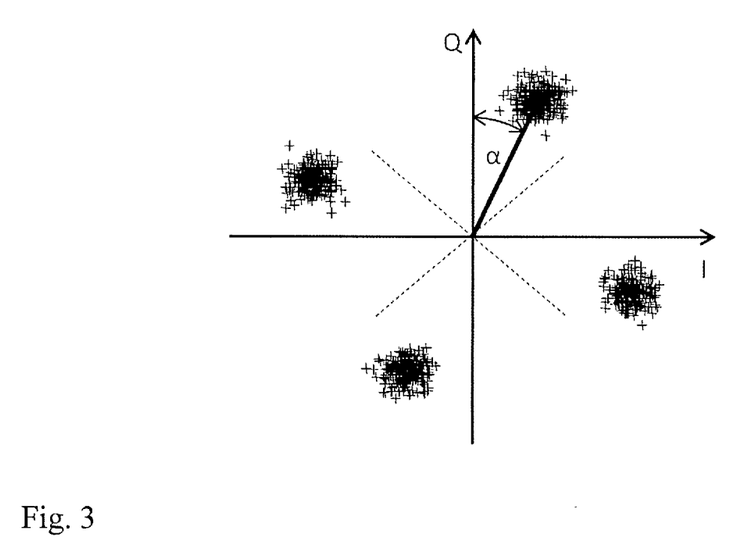
FIG. 3 is a rotated constellation diagram that corresponds to an imperfect frequency compensation.

FIG. 2 represents a case of perfect frequency compensation, i.e., the difference angular frequency $\Delta\omega=\omega_{LO}-\omega_{signal}=0$. However, in practice, perfect frequency compensation can hardly be achieved, mainly due to fluctuations in the local oscillator laser or other device imperfections. An imperfect frequency compensation will result in a rotation of the received symbols by an angle α. This is schematically illustrated in FIG. 3.

The rotation angle α can be calculated as $\alpha=\Delta\omega*\Delta t$ (in radian). In other words, the frequency control can lock to multiples of $\Delta\omega=n*\pi/(2*\Delta t)$. The value of a can be derived from the detected angles by for example determining the center-of-gravity of the symbol clouds of FIG. 3. Note, however, that it can only be determined modulo the number of possible phase angles. Hence, when four phase angles are possible, a can only be determined within ±45°. Higher values of α fold back into the lower bins.

As described above with reference to FIG. 2 and Table 1, a certain bit pair is detected if the calculated differential phase angle lies within the boundaries of the respective bin. For instance, if a differential angle is between −45° and +45°, it lies within the 0° bin and hence is decoded according to Table 1 as the bit pair {0,0}, and similarly for the other bins {0,1}, {1,0}, and {1,1}. Thus, in a noiseless system, α can be allowed to vary between −45° and +45°. Depending on the signal-to-noise ratio of the system, in practice the allowable tolerance for a is smaller, usually at around ±30°. For a digital quadrature phase shift keying system with a symbol rate of e.g. 622 Mbaud, this translates to a maximum allowable frequency offset of the local oscillator laser in the range of ±52 MHz. Hence, either the local oscillator laser or the down-converting frequency must be kept within this interval in order for the decoding to work reliably.

Controlling the local oscillator laser frequency or the down-converting frequency within approximately ±50 MHz is practically feasible, and has been shown to work in practice. However, when the system is started up, the local oscillator laser has to scan the available band for a signal. This scanning process needs to be relatively slow in order to get close enough to hit the right frequency window. A typical tunable laser covers an optical frequency band of about 4 THz or more. In order to scan that band with a resolution of about 100 MHz, about 40,000 steps are necessary. After each laser frequency step, the decoding unit 26 decodes the received bits and typically tries to recognize a specific pre-determined frame delimiter bit pattern in the received data stream. The bit stream consists of two bit pairs, and it is generally unknown where the bits start within this bit stream. In practice, four parallel frame hunter units may be employed to scan the bit stream for the frame delimiter pattern. Each frame hunter unit may use a different offset within the bit stream. Hence, even if the laser scans 100 steps per second, the full local oscillator laser scan could take up to 400 seconds in practice, which is too long for many practical applications.

The inventor found that the tolerance value for the maximum allowable frequency offset, and hence the speed of the initial locking process can be enhanced by adding one or more detection schemes that allow for higher values of the rotation angle α. Assuming that the rotation angle α exceeds 45°, all detected differential angles would fall into the wrong detection bin in FIG. 1. However, assuming that the angle α does not vary over time, this behavior is deterministic. For instance, assuming 45°<α≤135°, all detected signals are shifted clockwise by one bin, i.e., they fall into the neighboring bin along the clockwise direction. This can be accommodated by complementing Table 1 with a plurality of additional bit assignment patterns. For instance, three additional bit assignment patterns may be employed according to Table 2 to accommodate arbitrary values of a, wherein each decoding scheme corresponds to one detection bin in FIG. 1.

TABLE 2 three additional bit assignment patterns

| abs (α) ≤ 45° | | | 45° < α ≤ 135° | | | 135° < α ≤ 225° | | | 225° < α ≤ 315° | | |
|---|---|---|---|---|---|---|---|---|---|---|---|
| φ (degrees) | Bit "I" | Bit "Q" | φ (°) | Bit "I" | Bit "Q" | φ (°) | Bit "I" | Bit "Q" | φ (°) | Bit "I" | Bit "Q" |
| 0 | 0 | 0 | 0 | 1 | 1 | 0 | 1 | 0 | 0 | 0 | 1 |
| 90 | 0 | 1 | 90 | 0 | 0 | 90 | 1 | 1 | 90 | 1 | 0 |
| 180 | 1 | 0 | 180 | 0 | 1 | 180 | 0 | 0 | 180 | 1 | 1 |
| 270 | 1 | 1 | 270 | 1 | 0 | 270 | 0 | 1 | 270 | 0 | 0 |

As can be taken from Table 2, the first pattern for the range abs (α)≤45° is identical to Table 1. The three additional bit assignment patterns for the quadrants (i) 45°<α≤135°, (ii) 135°<α≤225° and (iii) 225°<α<315° are shifted versions of the first bit assignment pattern. Hence, these additional bit assignment patterns compensate for the rotation of the constellation by angles α with abs (α)>45°, and in effect rotate larger shift angles back into the first bin, so that bit values are assigned as if the absolute value of α were smaller than 45°.

The detected phases as such do not usually allow to infer the shift angle α. However, this may be achieved by checking the received signal for a pre-determined reference outcome, such as for a certain frame delimiter bit pattern which the sender unit 12 is known to transmit, as will now be explained with reference to FIG. 4.

Figure 4:
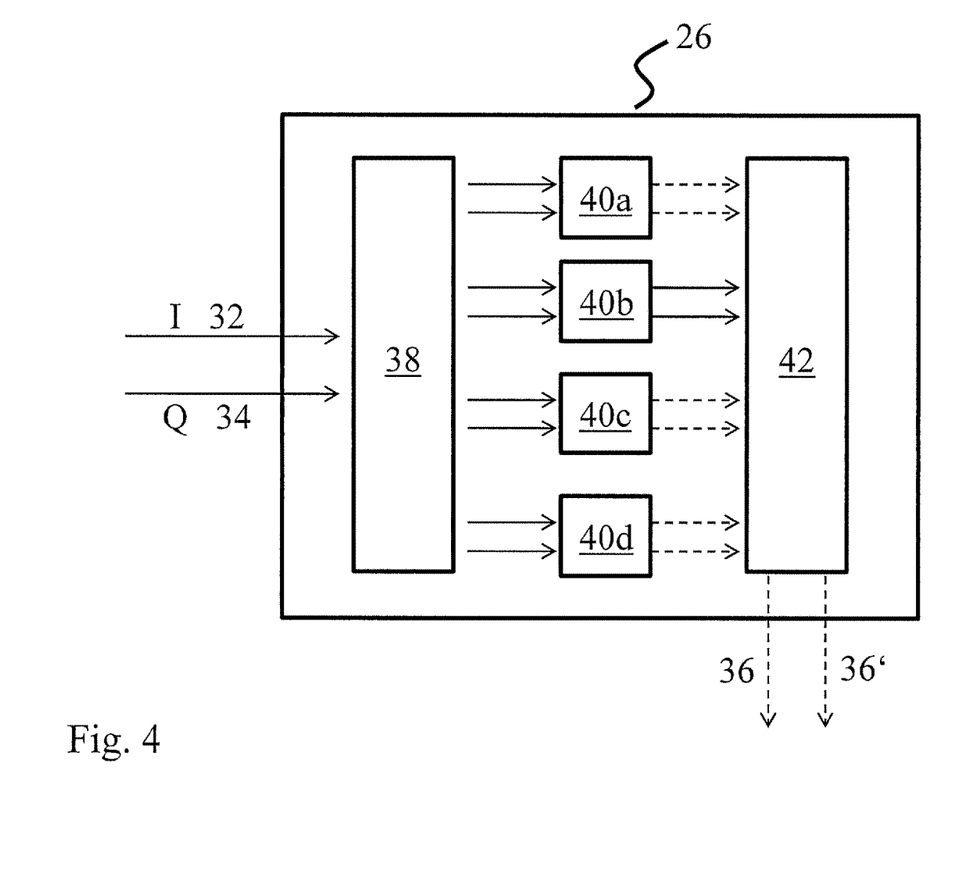
FIG. 4 is a schematic diagram of a decoding system according to an embodiment of the present invention.

FIG. 4 shows a detailed view of a decoding unit 26 according to an embodiment of the present invention. The decoding unit 26 comprises a copying unit 38, a plurality of frame hunter units 40a-40d, and a control unit 42.

The copying unit 38 copies the in-phase component 32 and the quadrature component 34 received from the mixing unit into four identical copies. These signal pairs are then supplied to four frame hunter units 40a to 40d that each analyze the incoming signals according to one of the four different bit assignment patterns in Table 2 and scan for the frame delimiter bit pattern. The frame delimiter pattern may be a pre-determined sequence of bits that the sender unit 12 is known to transmit as a reference pattern. Only one of the frame hunter units 40a to 40d will find the reference bit pattern, depending on the value of α, and will notify the control unit 42. For instance, assuming 45°<α≤135°, the frame hunter unit 40b that implements the second bit assignment pattern in Table 2 will detect the frame delimiter pattern, and will forward it to the control unit 42. The control unit 42 makes sure that all subsequent signals are decoded according to the corresponding bit assignment pattern, i.e., according to the second bit pattern in Table 2. The decoded bit values are output as the decoded signal bit stream 36, 36'.

Alternatively, in response to the range of a being detected by the control unit 42, the control unit 42 may send a control signal (not shown) to the local oscillator unit 24 to adapt the local oscillator frequency so that the shift angle α is reduced to the first quadrant abs (α)≤45°. All subsequent signals can then be decoded according to the first bit assignment pattern in Table 2, which corresponds to the original bit assignment pattern in Table 1.

In the embodiment described above with reference to FIG. 4 and Table 2, the frame hunter units 40a to 40d decode the incoming signal according to four different bit assignment schemes, and compare the outcome to a known frame delimiter pattern. Alternatively, the incoming signals 32, 34 may be decoded according to one fixed bit assignment pattern, such as the bit assignment pattern in Table 1 and may be compared to different (rotated) versions of the frame delimiter pattern. This provides another, equivalent means of determining the range of the shift angle α.

For simplicity, the examples described above assume M=4, and hence Δφ can have four different values. However, the same scheme can be employed for higher-order constellations that contain more data points.

In the examples described above, the invention has been described in the context of heterodyne detection. However, the same scheme can be employed for homodyne or intradyne detection.

The invention increases a tolerance window for the maximum allowable frequency offset, and hence can be used to achieve a faster initial scanning and locking to the transmitter data. At the same time, the invention allows to accommodate lasers with a lower tuning granularity, and hence enables faster and reliable coherent detection with less sophisticated and thereby cheaper equipment.

The description of the preferred embodiments and the accompanying drawings merely serve to illustrate the invention and the beneficial effects associated therewith, but should not be understood to imply any limitation. The scope of the invention is to be determined solely based on the appended set of claims.

Xieon Networks S.à.r.l.
X30344WO

| Reference Signs | |
|---|---|
| 10 | system for transmitting a modulated signal |
| 12 | sender unit |
| 14 | receiver unit |
| 16 | optical channel |
| 18, 18' | message bit streams |
| 20, 20' | carrier signals |
| 22 | mixing unit |
| 24 | local oscillator unit |
| 26 | decoding unit |
| 28 | first input of mixing unit 22 for modulated optical signal |
| 30 | second input of mixing unit 22 for local oscillator unit |
| 32 | in phase (I) component of demodulated signal |
| 34 | quadrature (Q) component of demodulated signal |
| 36, 36' | decoded signal bit stream |
| 38 | copying unit |
| 40a, b, c, d | frame hunter units |
| 42 | control unit |

The invention claimed is:

1. A method for decoding a modulated signal, said method comprising:

receiving an encoded signal, said encoded signal comprising a pair of an in-phase component and a quadrature component being extracted from a mixing signal, said mixing signal being obtained from mixing a received modulated signal at a first frequency with a local oscillator signal at a second frequency; and decoding said encoded signal according to a plurality of different decoding rules, said plurality of decoding rules corresponding to different values of a resulting frequency difference or mismatch between said first frequency and said second frequency.

2. The method according to claim 1, wherein said decoding step comprises a step of identifying a pre-determined reference outcome in said decoded signal.

3. The method according to claim 2, further comprising a step of determining said frequency difference or mismatch based on said identified reference outcome.

4. The method according to claim 2, further comprising a step of adjusting said frequency difference or mismatch in accordance with said identified reference outcome, wherein said adjusting step preferably comprises a step of tuning a local oscillator that supplies said local oscillator signal.

5. The method according to claim 1, further comprising a step of selecting a decoding rule among said plurality of different decoding rules, and employing said selected decoding rule to decode subsequent encoded signals.

6. The method according to claim 1, wherein said decoding step comprises a step of assigning different information symbols to said encoded signal in accordance with different assignment rules.

7. The method according to claim 6, further comprising a step of comparing a plurality of sequences of said information symbols to a predetermined reference outcome, said plurality of sequences corresponding to said different assignment rules.

8. The method according to claim 1, wherein said decoding step comprises a step of assigning information symbols to said encoded signal in accordance with an assignment rule, and comparing said information symbols against a plurality of reference outcomes.

9. The method according to claim 1, wherein said modulated signal is an optical M-ary modulated signal, M being a positive integer, in particular an optical M-ary phase modulated signal or an optical M-ary quadrature amplitude modulated signal.

10. The method according to claim 1, wherein said in-phase component (32) and said quadrature component are extracted from said mixing signal by means of heterodyne detection.

11. A computer program product comprising computer-readable instructions stored on a computer-readable medium that when the instructions are executed by a computer coupled to a system cause the computer to implement on said system a method according to claim 1.

12. A system for decoding a modulated signal, said system comprising:
a receiving unit adapted to receive an encoded signal, said encoded signal comprising a pair of an in-phase component and a quadrature component being extracted from a mixing signal, said mixing signal being obtained from mixing a received modulated signal at a first frequency with a local oscillator signal at a second frequency; and
a decoding unit adapted to decode said encoded signal according to a plurality of different decoding rules, said plurality of decoding rules corresponding to different values of a resulting frequency difference or mismatch between said first frequency and said second frequency.

13. The system according to claim 12, wherein said system comprises a local oscillator unit providing said local oscillator signal at said second frequency, and further comprises a mixing unit adapted to receive said modulated signal at said first frequency, to mix said modulated signal with said local oscillator signal and to extract said pair of said in-phase component and said quadrature component from said mixing signal, wherein said mixing unit is further adapted to provide said extracted pair to said decoding unit.

14. The system according to claim 12, wherein said decoding unit comprises a frame hunter unit adapted to compare said decoded signal to a pre-determined reference outcome.

* * * * *